Patented Aug. 25, 1953

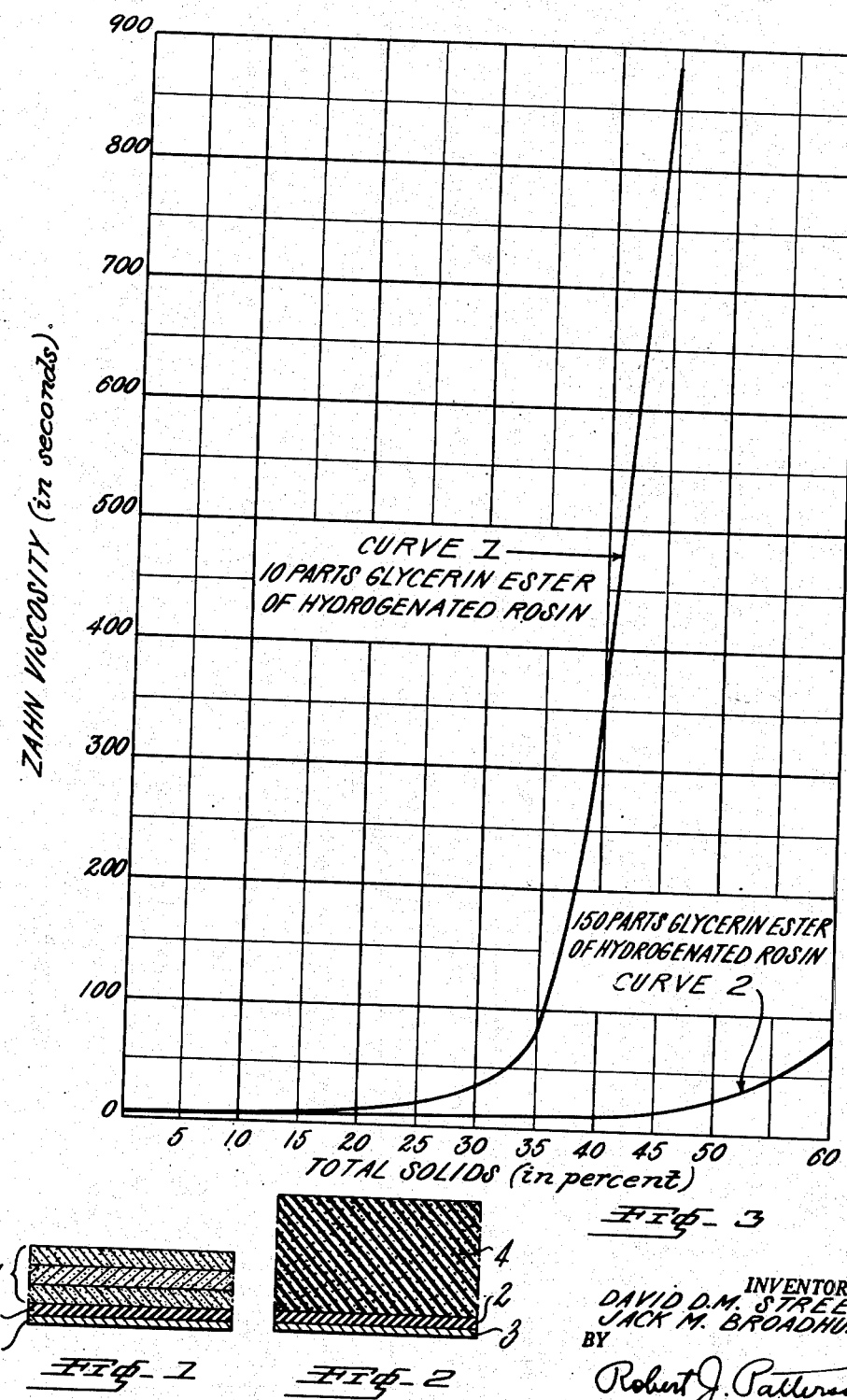
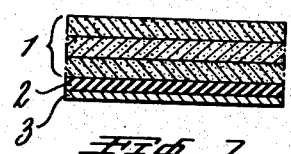

2,650,181

UNITED STATES PATENT OFFICE 2,650,181

ADHESIVE COMPOSITION, STRUCTURE EMBODYING SAME, AND PROCESS OF MAKING

David D. M. Streed and Jack M. Broadhurst, South Bend, Ind., assignors to United States Rubber Company, New York, N. Y., a corporation of New Jersey Application February 13, 1951, Serial No. 210,696

12 Claims. (Cl. 154—53.5)

This invention relates to a pressure sensitive adhesive composition of matter and more particularly to such an adhesive composition which is particularly adapted to use for adhering a backing material to another surface, as, for example, for adhering polyester resin laminates to surfaces to be covered therewith or for securing sponge rubber to another material such as textile fabric in the manufacture of weather stripping or shock-absorbing material. Still more particularly, the invention relates to an article of manufacture comprising a backing material provided with a layer of pressure sensitive adhesive which is provided with novel readily removable means (blocking agent) for preventing the pressure sensitive adhesive from sticking to itself or to other materials between the time of manufacture and the time of use.

There are many pressure sensitive adhesives available, but so far as we are aware all of them to date have been characterized by a comparatively weak bond. Thus the pressure sensitive adhesives with which we are familiar have possessed too weak a bond to be employed for adhering comparatively heavy rigid low pressure laminates, such as polyester resin laminates, to surfaces to be coated with such laminates. The weakness of the bond of such adhesives is particularly noticeable when it is attempted to secure a heavy polyester resin paper laminate in position on a vertical surface. Furthermore, the pressure sensitive adhesives of the prior art have not possessed sufficiently great surface tack to obtain uniform adhesion over dry, clean, unsized surfaces, porous or non-porous. In addition, the bond strength of most pressure sensitive adhesives deteriorates objectionably upon aging. An extremely serious defect of the previously employed pressure sensitive adhesives has been the rapidity with which they lose bond strength upon removal of the backing material and re-application. During installation it is usually necessary to remove and re-apply the article one or more times before it is in the final desired position. For example, it is often important to be able to remove and re-apply the adhesively coated backing material several times, particularly if it is sold to the general public which is not skilled in application methods. If the bond strength becomes rapidly less with repeated re-application, the utility of the material is greatly impaired.

We have discovered that a remarkable pressure sensitive adhesive composition of matter can be made from a thermoplastic copolymer of styrene and isobutylene, a pressure sensitivity-imparting component consisting of a material selected from the group consisting of the diethylene and triethylene glycol esters of $C_6$ to $C_{10}$ aliphatic saturated monocarboxylic acids, and a glycerin ester of hydrogenated rosin.

In the accompanying drawing, Fig. 1 portrays a polyester resin paper laminate provided with a coating of the adhesive composition of our invention, while Fig. 2 is a section of a sponge rubber strip embodying the pressure sensitive adhesive of our invention; and Fig. 3 graphically illustrates the effect of concentration of glycerin ester of hydrogenated rosin upon viscosity of our adhesive when in solution in an organic solvent.

The pressure sensitive adhesive of our invention is based upon a thermoplastic copolymer of styrene and isobutylene. Such a copolymer contains from 40 to 60% of combined styrene and correspondingly from 60 to 40% of combined isobutylene. We prefer to use those copolymers which contain from 45 to 55% of styrene and correspondingly from 55 to 45% of isobutylene. As the proportion of styrene is increased, the hardness, softening point and tensile strength of the adhesive are increased while the chemical properties are unchanged. The intrinsic viscosity of the styrene-isobutylene copolymer typically ranges from 0.7 to 0.9, a range of 0.7 to 0.8 being preferred. The styrene-isobutylene copolymer is thermoplastic, exhibits rubber-like properties of recovery and extensibility, is chemically saturated and is not vulcanizable. As a result, the adhesive based on this copolymer has excellent aging properties and does not become hard and brittle upon aging, which is a defect of most cured or curable rubber or rubber-resin adhesives. In addition, the styrene-isobutylene copolymer contributes outstanding resistance to transmission and to absorption of water; this is particularly important in an adhesive because many applications require excellent moisture resistance in order to maintain proper adhesion, and because, as will appear more fully hereinafter, we prefer to employ a layer of water-soluble blocking agent over the adhesive layer and to remove this blocking agent with water.

The styrene-isobutylene copolymer is converted into a pressure sensitive adhesive material by admixture with a diethylene or triethylene glycol ester of a $C_6$ to $C_{10}$ aliphatic saturated monocarboxylic acid. We can use a single $C_6$ to $C_{10}$ acid or we can use a mixture of such acids. Specifically, we prefer to use the diethylene glycol ester of pelargonic acid (available commercially as "Plasticizer X-55" and as "Plastolein 9055" from Emery Industries, Inc.) or the triethylene glycol ester of a mixture of $C_6$, $C_8$, and $C_{10}$ fatty acids, such as the material known commercially as "Plasticizer SC." The acid can be straight chain or branched. Examples of acids are caproic, caprylic, pelargonic, and capric acids. Both hydroxyl groups in the diethylene or triethylene glycol are esterified with the acid.

Both of the preferred plasticizers, namely, the diethylene glycol ester of pelargonic acid and the triethylene glycol ester of the mixed $C_6$, $C_8$ and $C_{10}$ fatty acids are light-colored, high-boiling liquids. Both are very heat stable, losing no more than 1.6% in weight after being held at 220° F. for 5 hours. Both exhibit remarkable stability upon aging of the adhesive.

The amount of the diethylene glycol or triethylene glycol diester of the $C_6$ to $C_{10}$ aliphatic saturated monocarboxylic acid can range from 50 to 125 parts by weight based on 100 parts of the styrene-isobutylene copolymer. When less than 50 parts is used tack is noticeable but the tack is not in the range of good pressure sensitive adhesives, whereas when over 125 parts is used an unsuitable low strength mass is produced. The preferred amount of the ester is from 70 to 110 parts per 100 parts of styrene-isobutylene copolymer. Generally speaking, the proportion of the diethylene glycol or triethylene glycol ester should be higher when soft porous materials like sponge rubber are being adhered than when rigid non-porous materials like polyester resin laminates are to be adhered.

The third essential ingredient of our adhesive composition is a glycerin ester of hydrogenated rosin. If this ingredient is omitted the adhesive mixture, although tacky, has little or no strength and is without utility for the intended purpose. However, the addition of the glycerin ester of hydrogenated rosin gives an adhesive which while retaining its tack at room temperature, said tack being largely imparted by the diethylene glycol or triethylene glycol diester, acquires a strong aggressive tack sufficient to hold a rather stiff laminated material in place on the surface to which it is adhered.

The glycerin ester of hydrogenated rosin preferably is substantially completely esterified, i. e., having a low acid number, typically of 10 or less. We have obtained unusually good results using the material sold commercially under the trade name "Staybelite Ester No. 10," this being a hard brittle, solid having a color grade of from N to WG, a specific gravity of 1.08, a melting point of 183° F., an acid number of 10 or less and an index of refraction of 1.532 at 20° C. This material was used in the examples given below.

The amount of the glycerin ester of hydrogenated rosin is extremely critical. As the amount of this component incorporated with the two components previously described is increased from 5 to 50 parts per 100 parts of the styrene-isobutylene copolymer, the adhesive composition becomes increasingly viscous, and in the upper portion of the indicated range it becomes so stiff that it can hardly be handled and when it is dissolved in solvent it is not possible to obtain a usable composition containing more than about 35% of total solids (non-volatiles). For commercially feasible adhesives a considerably higher solids content is essential. However, when the amount of glycerin ester of hydrogenated rosin is increased above 50 parts a peculiar inversion takes place and the viscosity drops sharply. Then at about 80 parts it begins to rise again but very slowly. We have found that adhesives containing from 70 to 200 parts of the glycerin ester of hydrogenated rosin per 100 of the styrene-isobutylene copolymer are commercially feasible because they can be made up with a total solids content of from 45 to 65%. This is a new and unexpected result which is important because it makes our adhesive commercially feasible. Our preferred range is from 100 to 150 parts of the glycerin ester of hydrogenated rosin per 100 parts of styrene-isobutylene copolymer.

In the typical practice of our invention, the foregoing three ingredients are dissolved in an inert volatile mutual organic solvent whereby upon evaporation of such solvent a solid film of the three ingredients in intimate homogeneous admixture is obtained. Although any inert mutual solvent can be used, we much prefer to use an essentially paraffinic volatile petroleum hydrocarbon solvent which upon evaporation leaves no gummy or asphaltic residues. We have obtained extremely good results using the petroleum solvent known as "Skelly Solve B" which chemically is hexane having a boiling range of 145–165° F. and a specific gravity of 0.685 at 60° F. The paraffinic solvent known as petroleum ether can also be used. The solids content of the adhesive solution made in this way can vary widely depending upon the method of application and the wishes of the operator. Typically the solids, i. e., non-volatile, content of the resulting solution will range from 15 to 65% by weight based on the solution a range of from 45 to 65% being especially preferred. The adhesive coating is applied as a film of suitable thickness after which the solvent is evaporated by drying. If desired, before the adhesive is completely free of solvent, an aqueous solution of the blocking agent (such as a water solution of soap) can be applied over the tacky adhesive surface and the water removed from this solution at the same time as the last traces of solvent are being removed from the adhesive.

We are not limited as to the type of material to which the adhesive composition of our invention is applied. Any material which it is desired to secure to another surface can be coated with our adhesive composition. Our invention has particular application to polyester resin laminates which are composed of layers of paper or cloth impregnated and bonded with a resinous polymerization product of a mixture of a compound having a single terminal ethylenic group $CH_2=C<$, such as a styrene, with an unsaturated alkyd resin which is the reaction product of an ethylenic-alpha-beta-di-carboxylic acid with a glycol, e. g., polyethylene glycol maleate.

Another very important commercial application of our pressure sensitive adhesive is its use for securing strips or sheets of sponge rubber to a metal or the like to make shock-absorbing and weather stripping structures adapted to support window glass as in automobiles, trains, etc.

Other materials to which the adhesive of our invention can advantageously be applied include vinyl and rubber flooring, wood, e. g., plywood, exploded wood fiber board (e. g., "Masonite"), sheet metal (e. g., aluminum), as well as polyethylene, cellophane, vinyl resin or other transparent, unsupported film of the type commonly employed for the manufacture of pressure sensitive adhesive tape.

In practicing our invention, it is preferred, and in commercial application it is essential, to provide means for preventing the pressure sensitive adhesive layer from sticking to itself or other materials from the time of manufacture to the time of use. This is most important because our adhesive is extremely tacky and has an extremely high green, i. e., initial, strength. Since our adhesive tenaciously sticks to all blocking papers commonly used with conventional pressure sensitive adhesives, it was necessary to provide some other means for preventing undesired premature adhesion. We found that this could be accomplished in a simple, economical and commercially feasible way by coating a layer of the pressure sensitive adhesive of our invention with a water-soluble material, preferably a water-soluble soap, such material being easily washed off the surface of the adhesive by simple washing with water at the time when the adhesive is to be used. Because all of the components of our adhesive are extremely water-resistant, such a water solution of a water-soluble material can be applied over the adhesive film and dried without injury to the adhesive, whereupon the material can be stored indefinitely. It is then only necessary to wash with water to "activate" the adhesive at the time of use. Any type of water-soluble non-tacky solid material can be used for this purpose, examples being starches, water-soluble cellulose derivatives, e. g., methyl cellulose or carboxy-methyl cellulose, and water-soluble resins, but we prefer to use a water-soluble soap, especially an alkali metal salt of a soap-forming fatty acid, such as sodium stearate soap, because of its ready availability and relatively low cost. We believe that the employment of this type of blocking agent is unique in the pressure sensitive adhesive field. The concentration of the water-soluble soap in the water solution which is thus used should be relatively high in order to reduce the amount of water which must be evaporated to form the blocking film. Exceedingly thin layers of the soap are highly effective to effect blocking.

In Fig. 1 of the drawing, 1 is a polyester resin laminate carrying on one face a layer 2 of our pressure-sensitive adhesive over which a layer 3 of the water-soluble blocking agent is provided. In Fig. 2 of the drawing, the rectangular strip 4 of sponge rubber similarly carries layers 2 and 3. Material of the type portrayed in Fig. 2 can be used around windows or in any type of joint where a resilient gasket is necessary, either to prevent wind from coming in, as in the case of a window, or to prevent squeaks, rattles, vibration or shock.

The level of solids application with our adhesive can vary within wide limits, depending upon many factors but typically ranges from 1 to 10 grams of total solids per square foot of adhesively coated surface. It will be seen that the level of solids application with our adhesive is low, this being attributable to the great tackiness and strength of our adhesive. The level of solids application with our adhesive is considerably lower than is feasible with rubber latex-based, e. g., oxidized latex-based, pressure-sensitive adhesives known at the present time.

In Fig. 3 there is portrayed graphically the variation in change of viscosity with change in total solids at two different concentrations of glycerin ester of hydrogenated rosin. The compositions used in determining the curves contained 100 parts styrene-isobutylene copolymer, 60 parts diethylene glycol and varying amounts of the glycerin ester of hydrogenated rosin, all dissolved in varying amounts of "Skelly Solve B" as the solvent. It will be noted that curve 1 for the composition which contained 10 parts of the rosin ester rises sharply at about 35% solids. This curve is followed substantially by all compositions containing up to about 50 parts of the rosin ester. There is a brief transition period and at 70 parts of the rosin ester the viscosity goes down, permitting incorporation of a much higher (and commercially feasible) percentage of solids. The remarkable decrease in viscosity is illustrated by curve 2 for the composition containing 150 parts of the rosin ester per 100 parts of the styrene-isobutylene copolymer.

The following examples illustrate our invention in more detail. All parts are by weight. The styrene-isobutylene copolymer used in the examples contained approximately 50% combined styrene and approximately 50% isobutylene and had an intrinsic viscosity of 0.75. The "shear tensile" determinaton in Examples 1 and 3 was a measurement of the force necessary to pull the backing material in a vertical direction from the base material. The determination was made in a Scott tester at a rate of 4 inches per minute.

EXAMPLE 1

*Typical pressure sensitive adhesive for adhering low pressure polyester resin laminates to surfaces*

FORMULA

|  | Dry | Wet |
|---|---|---|
| Petroleum Solvent ("Skelly Solve B") |  | 465.0 |
| Glycerin Ester of Hydrogenated Rosin | 150.0 | 150.0 |
| Diethylene Glycol Dipelargonate | 60.0 | 60.0 |
| Styrene-Isobutylene Copolymer | 100.0 | 100.0 |
|  | 310.0 | 775.0 |

FORMULATING PROCEDURE

Weigh out petroleum solvent.
Pulverize glycerin ester of hydrogenated rosin and add to petroleum solvent.
Weigh out and add dipelargonate to mixture.
Stir vigorously until esters are completely in solution.
Add isobutylene-styrene copolymer to mixture, stirring constantly until solution is complete.

An alternative mixing process is as follows: intimately mix the styrene-isobutylene copolymer and the glycerin ester of hydrogenated rosin together on a cold two-roll mill, sheet out the mix and cut the sheet into pieces approximately 2 inches square; dissolve these pieces in the solvent and after thorough dissolution add the dipelargonate.

The resulting composition has the following physical properties:

*a. Storage life of solvent based adhesive*

The solvent dispersed adhesive compound has an indefinite storage life, dependent upon the vapor seal of the container necessary to prevent the evaporation of the solvent. If the solvent evaporates, it is possible simply to add more solvent and redisperse the adhesive compound.

*b. Life of dried pressure sensitive precoated adhesive*

Tests to date indicate that there is no deterioration in green strength or ultimate bond strength of pressure sensitive precoated adhesive after pressure sensitive backed, low pressure laminate has been aged for 60 days at 158° F. This is roughly equivalent to 480 days at room temperature.

c. *Bond strength—low pressure laminates adhesion to plywood metal and Masonite*

Samples of the low pressure laminate were applied to Masonite, metal, and plywood. After 24 hours at room temperature, the samples were tested for shear tensile. The results were as follows:

*Shear tensile*

Laminate to: Lbs./sq. in.
Plywood ----------------------------------- 37
Masonite ---------------------------------- 33
Aluminum ---------------------------------- 21

EXAMPLE 2

*Typical pressure sensitive adhesive for adhering sponge rubber to porous and non-porous surfaces*

|  | Dry | Wet |
|---|---|---|
| Petroleum Solvent (as in Example 1) | 150.0 | 1,600.0 |
|  |  | 150.0 |
| Glycerin Ester of Hydrogenated Rosin | 70.0 | 70.0 |
| Diethylene Glycol Dipelargonate | 100.0 | 100.0 |
| Styrene-isobutylene Copolymer |  |  |
|  | 320.0 | 1,920.0 |

Mixing directions same as in Example 1.

EXAMPLE 3

The adhesive composition of Example 1 was compared with a pressure-sensitive rubber latex (oxidized latex) adhesive which is considered satisfactory in the trade, for securing sponge rubber to a base of aluminum. The level of solids application of the rubber latex adhesive was 18 grams per square foot while that of the adhesive of Example 1 was 6.3 grams per square foot.

The adhesive of Example 1 had an average shear tensile value in three determinations of 5.0 pounds per square inch while the latex adhesive gave an average shear tensile value of 4.3 pounds per square inch.

It was evident from cursory examination that the tensile determinations did not reflect the great superiority of the adhesive of Example 1 over the latex adhesive. This was indicated by the relative pull necessary to peel the sponge rubber from the aluminum surface. Accordingly, a test was devised in which the Scott tester was used to measure the "pull-up" tensile. A test sample of the sponge rubber, 1" x 4", was adhered to the aluminum base so that 1 square inch of area on the base was covered. The sample of sponge extended beyond the end of the base and was adhered at its other end in the same way to another similar piece of aluminum. The sponge rubber strip, being adhered at each end and free in the middle, was bent into the shape of an inverted U and the two projecting aluminum base pieces were clamped into the jaws of the Scott tester. The jaws were set to move apart at a rate of 4" per minute. This test, duplicating the type of pull met within service, gave an average value for three determinations of 2.0 pounds/sq. in. for the adhesive of Example 2 compared to an average value of three determinations of 0.82 pound/sq. in. for the latex adhesive in question.

In order to demonstrate the great superiority of the adhesive of Example 1 after removal and re-adhesion as compared to the rubber latex adhesive, we measured the re-sticking adhesion in the Scott tester using the pull-up tensile test just described. The results were as follows:

*Re-sticking adhesion*

|  | Pull-up Tensile of latex adhesive | Pull-up Tensile of adhesive of Example 1 |
|---|---|---|
|  | Lbs./sq. in. | Lbs./sq. in. |
| After initial adhesion | 0.9 | 1.7 |
| After second adhesion | 0.4 | 1.6 |
| After third adhesion | 0.1 | 1.2 |

It will be seen that when the sponge samples were restuck two more times after the original adhesion, the bond strength of the adhesive of Example 1 showed a loss of only 30%, whereas the latex adhesive showed a loss of 90%; the actual values of the pull-up tensiles in the case of the latex adhesive were so low as to be almost negligible after the second removal.

In the tests reported in Example 3, all samples of sponge were adhered to aluminum because this is a nonporous surface to which it is most difficult to get good adhesion. The bond strength in the case of adhesion to porous surfaces would be much greater.

The reason why the "shear tensile" values given in Examples 1 and 3 for use of the adhesive of Example 1 to secure a polyester resin laminate and sponge rubber, respectively, to aluminum are so widely divergent (21 lbs. in Ex. 1 and 5 in Ex. 3) is because of the nature of the materials being secured. Thus the polyester resin laminate is very rigid and stiff whereas the sponge rubber is relatively limber and deforms readily under tension. When the adhesion is tested by shearing the rubber from the aluminum, the rubber elongates and deforms so that the results are not comparable to those obtained with the laminate. In addition to the fact that the shape of the rubber changes, it is probably also a fact that the adhesive does not stick quite as well to the rubber as to the laminate.

From the foregoing description, many advantages of our invention will be apparent to those skilled in the art. Our adhesive remains pressure sensitive indefinitely. In addition to being pressure sensitive it is also heat sensitive at temperatures above 225° F. Our adhesive will adhere to all types of porous and non-porous surfaces. Our adhesive is inert and not harmful to the materials generally adhered therewith, such as low pressure laminate, sponge rubber, metals, transparent structureless film or foil, etc. It is extremely tacky and has extremely high initial strength. Furthermore, the high bond strength of our adhesive does not deteriorate upon aging. By the use of our water-soluble blocking agent, the extremely high tack of our adhesive is easily preserved over an indefinite period. The blocking agent is easily removed by simple water washing at the time when the adhesive is to be used. Our adhesive is extremely water-resistant and is not affected by water during application of the blocking agent, during activation and after application of the adhesively coated material to the backing. Our final adhesive film contains no solvent of any kind. Residual solvents in the adhesive layer would eventually evaporate and thus change the properties of the adhesive. Although we use a solvent as a means of applying our adhesive composition to the backing material, nevertheless all of the solvent so used is removed from the adhesive film before the adhesive is used. Furthermore we can use the relatively cheap and non-toxic paraffin hydrocarbon solvents to dissolve the components of our adhesive to an intimate, homogeneous mixture and enable our adhesive to be applied in a simple and economical manner to the material to be adhered. The ingredients of our adhesive are chemically saturated, thus imparting excellent aging characteristics. The sensitivity of our adhesive is such that the backing material can be removed and put back in place repeatedly with relatively little loss in bonding strength. Our adhesive is of such nature that a good bond can easily be obtained by hand pressure alone without tiring the workmen, it being unnecessary to use mechanical presses to insure a good bond. Another advantage of our invention is that the use of inflammable or toxic volatile organic solvents is eliminated in the application of the blocking agent and in the removal of the blocking agent. Another advantage is that thin and economical coatings of our adhesive are highly effecitve. Many other advantages will be obvious to those skilled in the art.

Having thus described our invention, what we claim and desire to protect by Letters Patent is:

1. A pressure sensitive adhesive composition of matter comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer.

2. A pressure sensitive adhesive composition of matter comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 70 to 110 parts per 100 parts of said copolymer, and a glycerin ester of hydrogenated rosin in an amount ranging from 100 to 150 parts per 100 parts of said copolymer.

3. A pressure sensitive adhesive composition of matter comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, said ingredients being dissolved in a volatile essentially paraffinic petroleum hydrocarbon solvent to form a solution containing from 15 to 65 per cent solids.

4. An article of manufacture comprising a backing material having on a surface thereof a layer of a pressure sensitive adhesive composition comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acid in an amount ranging from 50 to 125 parts per 100 parts of said copolymer, and a glycerin ester of hydrogenated rosin in an amount ranging from 70 to 200 parts per 100 parts of said copolymer.

5. An article of manufacture comprising a backing material having on a surface thereof a layer of a pressure sensitive adhesive composition comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, and superimposed upon said layer of said pressure sensitive adhesive composition a layer of a solid water-soluble blocking agent.

6. An article of manufacture comprising a backing material having on a surface thereof a layer of a pressure sensitive adhesive composition comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, and superimposed upon said layer of said pressure sensitive adhesive composition a layer of a solid water-soluble soap as a blocking agent.

7. An article of manufacture comprising a backing material composed of a laminate of fibrous material impregnated and bonded together with a resinous polymerization product of a mixture of a compound having a single terminal ethylenic group $CH_2=C<$ with an unsaturated alkyd resin which is the reaction product of an ethylenic-alpha-beta dicarboxylic acid with a glycol, said laminate having on a surface thereof a layer of a pressure sensitive adhesive composition comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer.

8. An article of manufacture comprising a backing material composed of a laminate of fibrous material impregnated and bonded together with a resinous polymerization product of a mixture of a compound having a single terminal ethylenic group $CH_2=C<$ with an unsaturated alkyd resin which is the reaction product of an ethylenic-alpha-beta dicarboxylic acid with a glycol, said laminate having on a surface thereof a layer of a pressure sensitive adhesive composition comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, and superimposed upon the surface of said layer of said pressure sensitive adhesive composition a layer of a solid water-soluble soap as a blocking agent.

9. As a new article of manufacture a backing material composed of sponge rubber having on a surface thereof a layer of a pressure sensitive adhesive composition of matter comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer.

10. As a new article of manufacture a backing material composed of sponge rubber having on a surface thereof a layer of a pressure sensitive adhesive composition of matter comprising a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, and on the surface of said layer of said pressure sensitive adhesive composition a layer of a solid water-soluble soap as a blocking agent.

11. The process which comprises applying to a backing material a solution in an inert volatile mutual organic solvent of a thermoplastic copolymer of styrene and isobutylene in proportions ranging from 40 to 60 per cent of styrene and from 60 to 40 per cent of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, and allowing said solvent to evaporate.

12. The process which comprises applying to a backing material a solution in an inert volatile mutual organic solvent of a thermoplastic copolymer of styrene and isobutylene in proportions ranging from 40 to 60% of styrene and from 60 to 40% of isobutylene, a pressure sensitivity-imparting component selected from the group consisting of diethylene glycol and triethylene glycol esters of $C_6$ to $C_{10}$ aliphatic saturated monocarboxylic acids in an amount ranging from 50 to 125 parts per 100 parts of said copolymer, and a glycerin ester of hydrogenated rosin in an amount ranging from 70 to 200 parts per 100 parts of said copolymer, allowing said solvent to evaporate at least partially, applying over the resulting pressure sensitive adhesive layer a coating of a water solution of a water-soluble soap, and thereafter evaporating any residual solvent from said layer and the water from said coating of said water solution to form on the surface of the adhesive layer a layer of a solid water-soluble soap as a blocking agent.

DAVID D. M. STREED.
JACK M. BROADHURST.

References Cited in the file of this patent

UNITED STATES PATENTS

| Number | Name | Date |
|---|---|---|
| 124,542 | Cable | Mar. 12, 1872 |
| 2,292,924 | Dreher | Aug. 4, 1942 |
| 2,353,256 | Maywald | July 11, 1944 |
| 2,439,202 | Daly | Apr. 6, 1948 |
| 2,447,367 | Rust et al. | Aug. 17, 1948 |
| 2,485,248 | Watson et al. | Oct. 18, 1949 |
| 2,530,099 | Van Buskirk et al. | Nov. 14, 1950 |